Patented Dec. 30, 1930

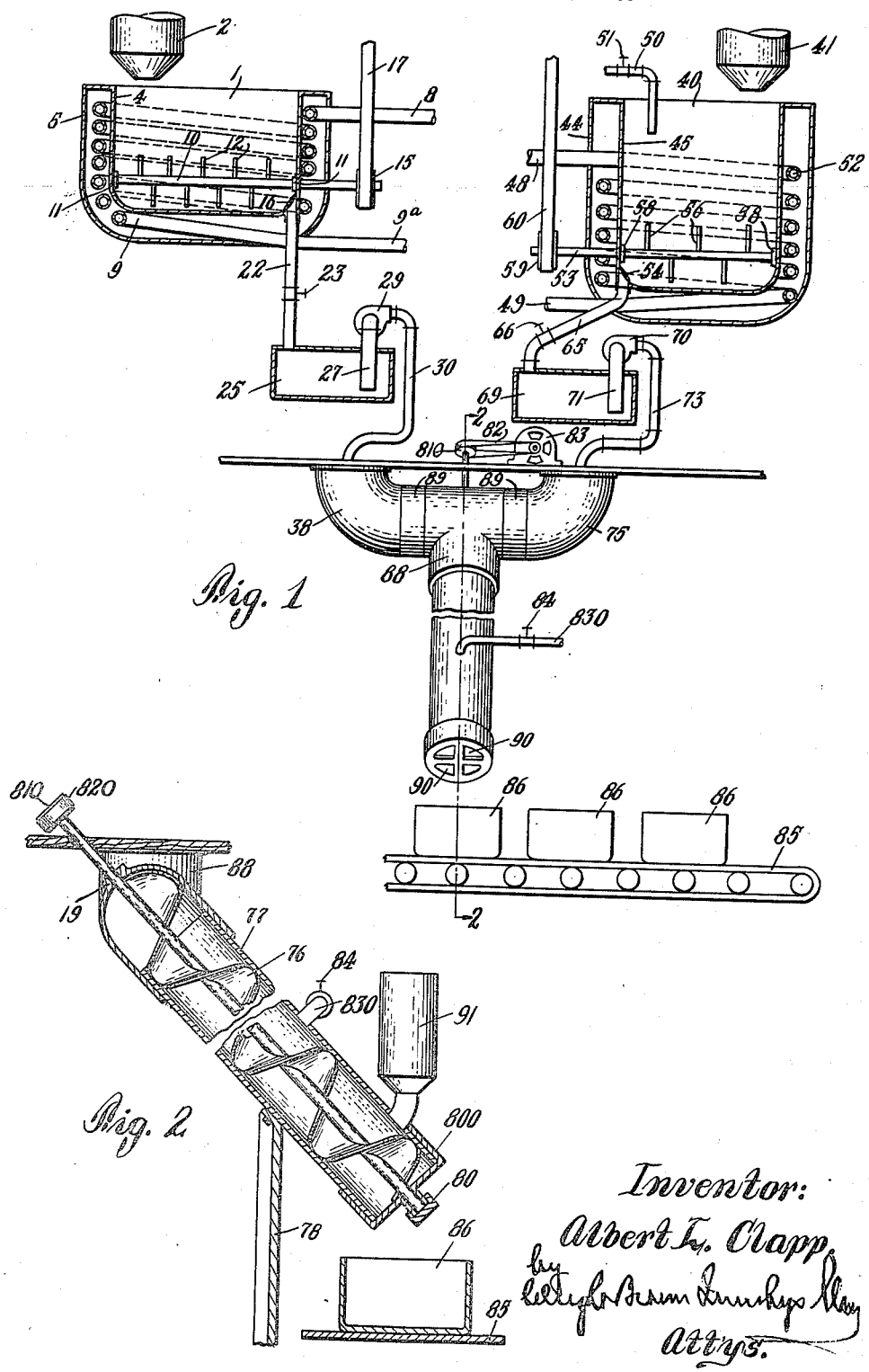

1,787,339

UNITED STATES PATENT OFFICE

ALBERT L. CLAPP, OF DANVERS, MASSACHUSETTS, ASSIGNOR TO BENNETT, INCORPORATED, OF BOSTON, MASSACHUSETTS, A CORPORATION OF MASSACHUSETTS

APPARATUS FOR PRODUCING AQUEOUS DISPERSIONS

Original application filed September 8, 1925, Serial No. 55,063. Divided and this application filed February 1, 1927. Serial No. 165,106.

This invention has relation to a method of and device for producing dispersions, and more particularly dispersions of thermoplastic materials such as bituminous gums and waxes, and has for its object to provide a method and a device for producing such dispersions in a continuous, efficient, and economical manner.

For producing dispersions of thermoplastic materials such as described in my application, Serial No. 55,063, filed September 8, 1925, the method comprises heating and melting the thermoplastic material to be dispersed and while in molten condition intimately mixing or agitating therewith a heated dispersing solution, e. g.; a solution of sodium silicate. The mixture need be agitated only for a relatively short period of time to produce the desired dispersion, so that substantial saponification, when the thermoplastic material to be dispersed is saponifiable, is avoided. To prevent coalescence of the dispersed particles into agglomerates while molten, the dispersion is preferably rapidly cooled or chilled immediately after it has been produced, thus effecting a freezing or congelation of the dispersed particles. This also further reduces the extent to which saponification may take place.

In accordance with the method of the present invention, the constituents of a dispersion such as hereinbefore described are fed in continuous streams and at predetermined rates through a mixing chamber, and while passing through the chamber are intimately mixed together to produce a single stream of finished dispersion.

A more complete understanding of the present invention may be gained from the following description thereof when taken in conjunction with the accompanying drawings, wherein Figure 1 represents a front view of apparatus, partly in section, for producing the dispersion.

Figure 2 is a sectional view through the mixer, along the line 2—2 of Figure 1.

Referring to the drawings, 1 represents a melting kettle into which the thermoplastic material to be melted and dispersed is charged from a hopper 2 thereabove. The kettle, as shown, is double-walled, comprising respectively the inner and outer walls 4 and 5 enclosing a heating space in which any suitable means for heating and melting the thermoplastic material to be dispersed may be provided. The heating means may consist of a steam heating coil 9 to which steam at suitable temperature and pressure is supplied through an inlet conduit 8, and from which condensate is removed through an outlet conduit 9a. To ensure uniform heating of the molten thermoplastic material, provision is made to cause its circulation in the kettle. For this purpose the kettle is provided with a stirrer, comprising a shaft 10 carrying a plurality of paddles or stirring blades 12, and journaled in a pair of bearings 11, 11, in the wall 4 of the kettle. Rotation of the stirrer shaft may be effected as by a belt pulley 15 fixed to its outer end and driven by a belt 17 from a motor or countershaft (not shown). The molten thermoplastic material, heated to the proper temperature, passes from the kettle through a screened outlet 16 at its bottom, through a pipe 22 valved as at 23, into a storage tank 25, from which it is supplied to the mixer in a continuous stream and at a predetermined rate by a pump 29 communicating with the storage tank 25 through an intake pipe 27, and delivering the molten material through a discharge pipe 30 to a continuous mixer wherein it is mixed with the dispersing solution.

The dispersing solution, which may be a solution of sodium silicate, is made up and heated to the desired temperature in a kettle 40. The silicate may be fed into the kettle from a hopper 41 situated thereabove, and is diluted with the proper proportion of water delivered from a water supply line 50, valved as at 51. The kettle 40 may be similar in construction to the kettle 1, and may consist of two spaced walls 44 and 45, between which is disposed a steam coil 52 having steam inlet 48 and condensate outlet 49. To produce a uniform solution and promote uniform heating of the solution, the kettle 40 is also provided with a stirrer consisting of a shaft 53 having a plurality of paddles 56 and journaled in bearings 58, 58 in the inner wall 45 of the kettle. Rotation may be imparted to the shaft 53 by a belt pulley 59 fixed to its outer end and driven by a belt 60 from a countershaft or motor (not shown). The dispersing solution, heated to the desired temperature, flows from the kettle through a screened outlet 54 at its bottom, and then through a pipe 65, valved at 66, into a supply tank 69, from which it is supplied in a continuous stream at a predetermined rate to the mixer, by a pump 70 communicating with the supply tank 69, through an intake pipe 71, and discharging the solution through a discharge pipe 73 into the mixer.

The mixer is of the continuous type and comprises a worm of spiral 76, arranged axially in a cylindrical shell 77, disposed at an angle to the horizontal and supported by frame member 78. A T-fitting 88 is connected to the upper end of the shell, which fitting is connected on its opposite ends by the union 89, 89 to elbows 38 and 75 serving respectively as spaced inlets for the molten material from the pipe 30 and the dispersing solution from the pipe 73. The worm 76 is on a shaft 810 arranged axially within the shell 77 and journaled at its upper end in a bearing 19 afforded by the T 88, and at its lower end in a step bearing 80 on an apertured cap 800 at the lower end of the casing. The shaft 810 has a belt pulley 82 fixed thereto at its upper end between the spaced inlets and to which rotation is imparted as by a belt 820 from a motor 83.

The streams of molten material and dispersing solution flow together at the upper end of the mixer and are intimately agitated or mixed by the worm, resulting in a single stream of finished dispersion which gravitates and is conveyed toward the lower or discharge end of the mixer so that the mixer is maintained substantially free from accumulation of finished dispersion therein. An important advantage of a method such as described is that, once the finished dispersion is produced, it is emitted practically immediately from the mixer, so that energy is not unnecessarily expended thereon. The dispersion may be simultaneously cooled and diluted prior to its discharge, by introducing water into the casing 77 through a conduit 830 valved as at 84. The dispersion is finally discharged through apertures 90 through cap 800, into suitable containers 86 on a conveyor 85. Preferably, the casing communicates at its lower end with a hopper 91 into which various materials which it may be desired to incorporate into the dispersion may be introduced.

This application is a division of my application, Serial No. 55,063, filed September 8, 1925.

I claim:

1. Apparatus of the class described, comprising in combination a pair of material heaters, means for stirring material fed into said heaters, tanks arranged to receive material from said heaters, a cylindrical shell into one end of which continuous streams of heated material from said tanks may be delivered, a shaft arranged axially within said shell, and a spiral conveyor on said shaft for mixing and conveying the materials as a continuously moving stream from said one end through the shell.

2. Apparatus of the class described, comprising in combination a pair of material heaters, means for stirring material fed into said heaters, tanks arranged to receive material from said heaters, a cylindrical shell into one end of which continuous streams of heated material from said tanks may be delivered, a pipe communicating with the interior of said shell for delivering another material thereinto, a shaft arranged axially within said shell, and a spiral conveyor on said shaft for mixing and conveying the materials as a continuously moving stream from said one end through the shell.

3. Apparatus of the class described, comprising in combination a pair of material heaters, means for stirring material fed into said heaters, tanks arranged to receive material from said heaters, a downwardly-inclined cylindrical shell having a pair of spaced inlets at its upper end into which continuous streams of heated material from said tanks may be delivered and having an outlet at its lower end, a shaft arranged axially within said shell, and a spiral conveyor on said shaft for mixing and conveying the materials as a continuously moving stream from its upper end through the shell.

4. Apparatus of the class described, comprising in combination a pair of material heaters, a cylindrical shell having a pair of inlets at one end into which a continuous stream of heated material from each of said heaters may be delivered and having an outlet at the other end, a shaft arranged axially within said shell, and a spiral conveyor on said shaft for mixing and conveying the materials as a continuously moving stream from one end of the shell to the other.

5. Apparatus of the class described, comprising in combination a pair of material heaters, a cylindrical shell having a pair of inlets at one end into which continuous streams of heated material from said heaters may be delivered and having an outlet, a shaft arranged axially within said shell, a spiral conveyor on said shaft for mixing and conveying the materials as a continuously moving stream from one end of the shell to the other, and means for introducing other material into the continuous stream near the lower end of said shell.

In testimony whereof I have affixed my signature.

ALBERT L. CLAPP.